US007552904B2

(12) United States Patent
Zehnder et al.

(10) Patent No.: US 7,552,904 B2

(45) Date of Patent: Jun. 30, 2009

(54) PORTABLE HANGER ATTACHABLE TO A VERTICAL SUPPORT

(75) Inventors: Joseph Zehnder, Boise, ID (US); Judy Zehnder, Boise, ID (US)

(73) Assignee: Outdoor Concepts, Inc., Boise, ID (US)

( * ) Notice: Subject to any disclaimer, the term of this patent is extended or adjusted under 35 U.S.C. 154(b) by 84 days.

(21) Appl. No.: 10/905,883

(22) Filed: Jan. 25, 2005

(65) Prior Publication Data

US 2006/0163439 A1 Jul. 27, 2006

(51) Int. Cl.
*F16M 11/00* (2006.01)

(52) U.S. Cl. .................................. 248/682; 248/309.1

(58) Field of Classification Search ................ 248/682, 248/218.4, 219.4, 309.1, 316.7, 317; 190/901, 190/903, 125, 107, 102, 1, 16

See application file for complete search history.

(56) References Cited

U.S. PATENT DOCUMENTS

| | | | | |
|---|---|---|---|---|
| 1,600,027 | A * | 9/1926 | Welsand | 224/223 |
| 4,144,673 | A * | 3/1979 | Quast et al. | 47/57.5 |
| 4,747,527 | A * | 5/1988 | Trumpower, II | 224/662 |
| 4,953,819 | A * | 9/1990 | Davis | 248/227.3 |
| 5,240,156 | A * | 8/1993 | Sicotte et al. | 224/583 |
| D369,674 | S * | 5/1996 | Schreiner et al. | D3/228 |
| D411,659 | S * | 6/1999 | Karton | D3/226 |
| 6,109,496 | A * | 8/2000 | Andrew et al. | 224/664 |
| 6,298,944 | B1 * | 10/2001 | Forbes et al. | 182/3 |
| 6,966,439 | B2 * | 11/2005 | Weleczki | 206/315.3 |

* cited by examiner

*Primary Examiner*—A. Joseph Wujciak, III
(74) *Attorney, Agent, or Firm*—Holland & Hart LLP

(57) ABSTRACT

A portable hanger is securable to a vertical support such as a tree. The portable hanger includes a foldable backing with a closure device. A strap coupled to one end of the backing and releaseably coupled to the other end of the backing allows the hanger to be secured about a vertical support. Containing in the hanger are a plurality of hooks and slots, as well as a bag or closure device.

5 Claims, 10 Drawing Sheets

306
308
108
118
122
310
120
122
300
302
304

1220
1222
1218
1216
1214
1212
1210

1204
1204
1208
1202
1204
1203
1200

1208
1204
1202
1202
1204
1300
1300
1202
1203
1200

PORTABLE HANGER ATTACHABLE TO A VERTICAL SUPPORT

FIELD OF THE INVENTION

The present invention relates to outdoor equipment and, more specifically, to a hanger attachable to a vertical support, such as, for example, a pole, column, or tree having one or more mechanisms to hold other equipment.

BACKGROUND OF THE INVENTION

Camping, hiking, fishing, rafting, hunting, picnicking, and other outdoor activities may involve numerous pieces of equipment, such as, food and cooking equipment, safety equipment, electronic equipment (such as cellular telephone, PDAs, Blackberries, Global Positioning Devices, cameras, flashlights, and the like), clothing, towels, keys, wallets, eyewear, footwear, toiletries, trash bags, lotions, sprays, food lockers, first aid kits, or the like. Unfortunately, it is often difficult to find suitable and convenient places to store personal items and outdoor gear during the activities.

U.S. Pat. No. 5,301,911, issued Apr. 12, 1994, titled PORTABLE HANGING SYSTEM FOR ATTACHMENT TO VERTICAL OBJECTS, discloses one way to provide places to hang equipment and the like. The '911 patent discloses a belt like device that can be secured around a vertical support, such as, a tree. Hooks attach to the belt. Equipment can be hanged on the hooks or the like attached to the belt. While satisfactory for hanging equipment, the '911 patent is difficult to use and transport. In particular, the device of the '911 patent is broken down and packaged in other portable equipment, such as a backpack, pocket or the like. The transfer of many loose pieces facilitates misplacing parts and the like. Moreover, while the '911 patent does provide limited ability to hang equipment or cloths capable of attaching to a hook, it does not facilitate hanging equipment that may not be connectable to a hook, such as, for example, a cutting knife, keys, wallet, medicine, lotions, sprays, cellular telephone, first aid kits, sunglasses or eyewear, or the like. Additionally, any devices hanged using the device of the '911 patent tend to hit, brush, or rub against the vertical support, which is typically a tree. Tree bark is a rough and/or abrasive surface and may omit tree sap. The rough surface and/or sap of the tree can cause increased wear, scratching, or damage to the equipment being hanged. U.S. Pat. No. 6,196,511, issued Mar. 6, 2001, titled PORTABLE HOOK HANGING SYSTEM FOR ATTACHMENT TO VERTICAL OBJECTS, incorporated herein by reference, discloses a similar system.

U.S. Pat. No. 6,298,944, issued Oct. 9, 2001, titled METHOD OF FORMING MULTI-PURPOSE HUNTING APPAREL, discloses another type of equipment. The '944 patent discloses a backpack type device that is convertible such that the backpack straps can be secured about a tree, or the like, to hang equipment. The '944 patent, however, is bulky and providing a backpack with equipment for hanging tends to decrease the functionality of the backpack. Furthermore, it is difficult to modify or alter the '944 patent to increase or decrease the compartment or holding capacity of the backpack.

Thus, it would be desirable to develop a portable, foldable hanger attachable to a vertical surface.

SUMMARY OF THE INVENTION

The present invention provides a portable hanger securable to a vertical support such as a tree. The portable hanger includes a foldable backing with a closure device. A strap coupled to one end of the backing and releaseably coupled to the other end of the backing allows the hanger to be secured about a vertical support. Containing in the hanger are a plurality of hooks and slots, as well as a bag or closure device.

The foregoing and other features, utilities and advantages of the invention will be apparent from the following more particular description of a preferred embodiment of the invention as illustrated in the accompanying drawings.

BRIEF DESCRIPTION OF THE DRAWING

The accompanying drawings illustrate various embodiments of the present invention and are a part of the specification. The illustrated embodiments are merely examples and illustrations of the present invention and do not limit the scope of the invention.

DETAILED DESCRIPTION

Figure 1:
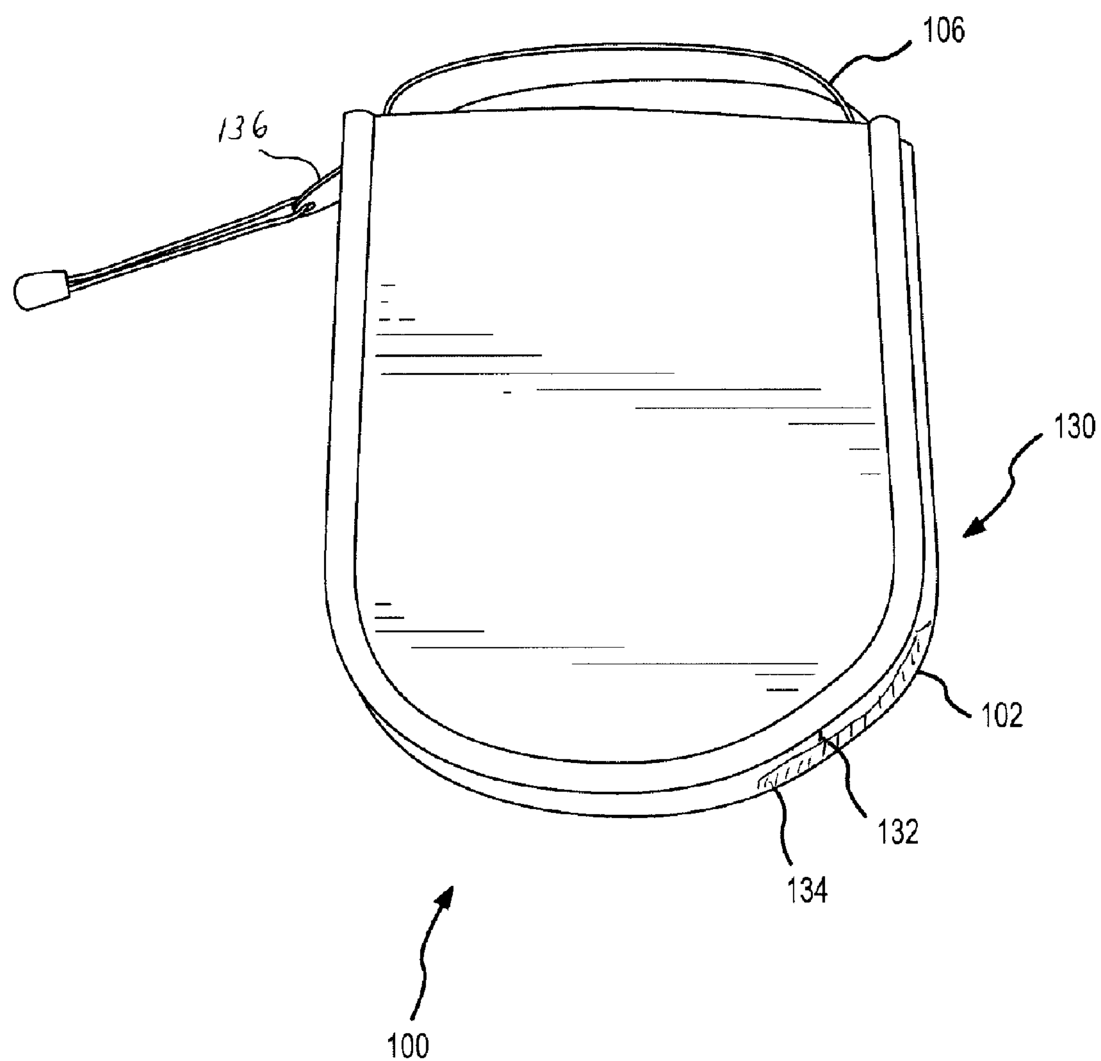
FIG. 1 illustrates a hanger constructed in accordance with an embodiment of the present invention in a closed position.
Figure 2:
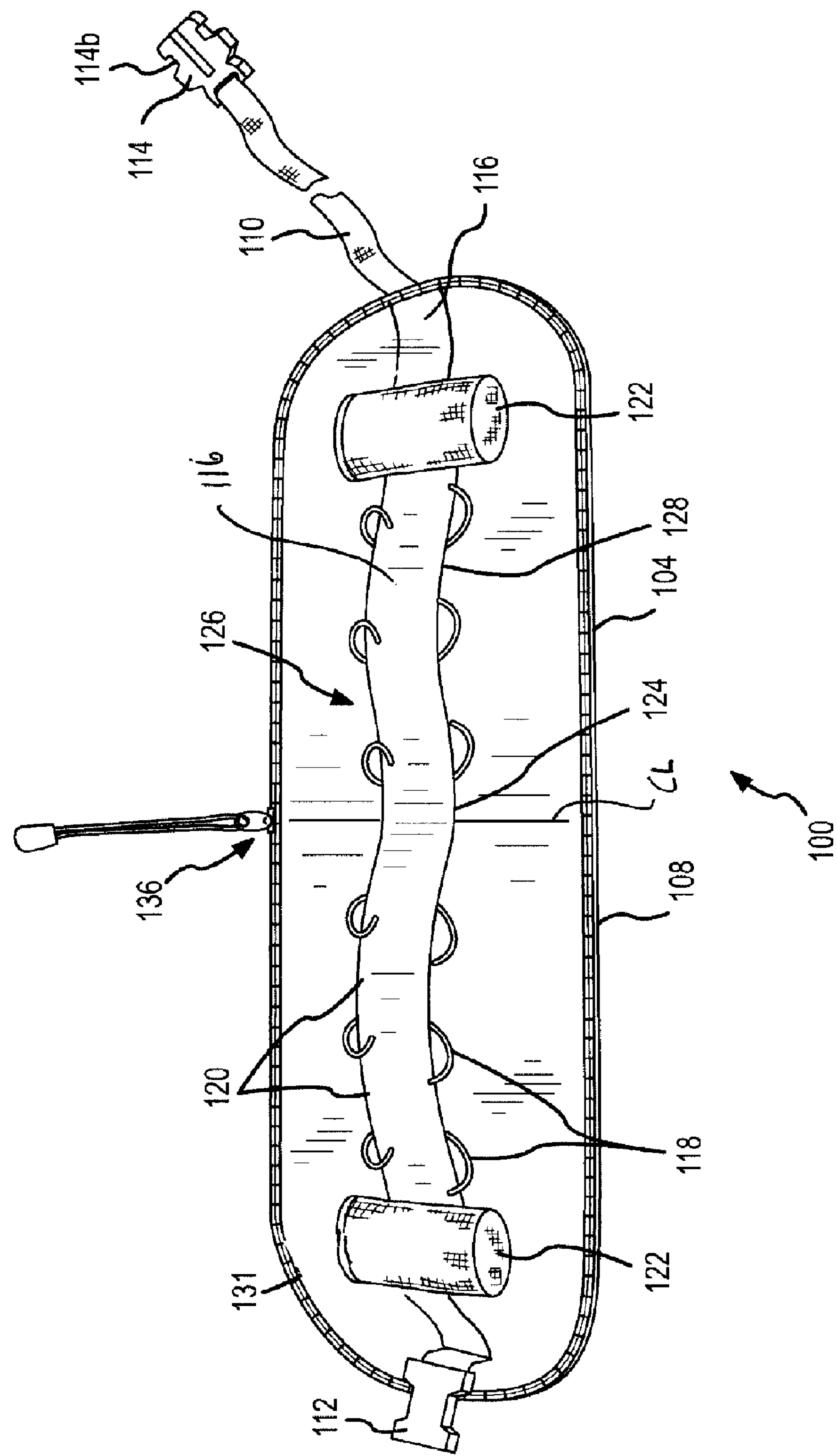
FIG. 2 illustrates the hanger of FIG. 1 in the open position.

The present invention will be described with reference to FIGS. 1-13. Referring first to FIGS. 1 and 2, the individual components of a portable hanger 100 will be described. Referring first to FIGS. 1 and 2, portable hanger 100 is shown in a folded or closed position 102 (FIG. 1) and an open position 104 (FIG. 2). As can be seen, in the closed position 102 the hanger 100 forms a convenient pouch with a carrying strap 106. In the open position 104, hanger 100 has foldable backing 108 with an adjustable strap 110. Adjustable strap 110 has a snap lock with a elastic snap receptacle 112 on one end and a elastic prong 114. Elastic prong 114 may include a buckle 114*b* to facilitate adjustment of adjustable strap 110. Adjustable strap 110, receptacle 112, prong 114, and buckle 114*b* are common in the art and will not be further explained herein.

Adjustable strap 110 is coupled to a holding portion 116. Holding portion 116 comprises hooks 118, slots 120, and bags 122. Holding portion 116 is fixed to backing 108 using a conventional coupling 124, such as, for example, stitching, glue, heat welding, or the like. Slots 120 could comprise through holes 126 defined by gaps in coupling 124. Slots 120 could have bottoms 128 if desired, which would make slots 120 similar to bags 122. Bags 122 could be mesh bags as shown or other types of fabric. Generally, adjustable strap 110 and bags 122 are made of durable material, such as, for example, nylon, leather, synthetic leather, or the like, although the material is largely a matter of design choice.

Hanger 100 also may have a closure device 130 coupled to an outer edge 131 of foldable backing 108. Closure device 130 could be hook material 132 and corresponding loop or pile material 134, see FIG. 1 (similar to VELCRO®), or a zipper 136, see FIG. 2. Alternative and well know closure devices could be used instead of hook and loop materials 132 and 134, and/or a zipper 136 as are generally known in the art as a matter of design choice.

Figure 3:
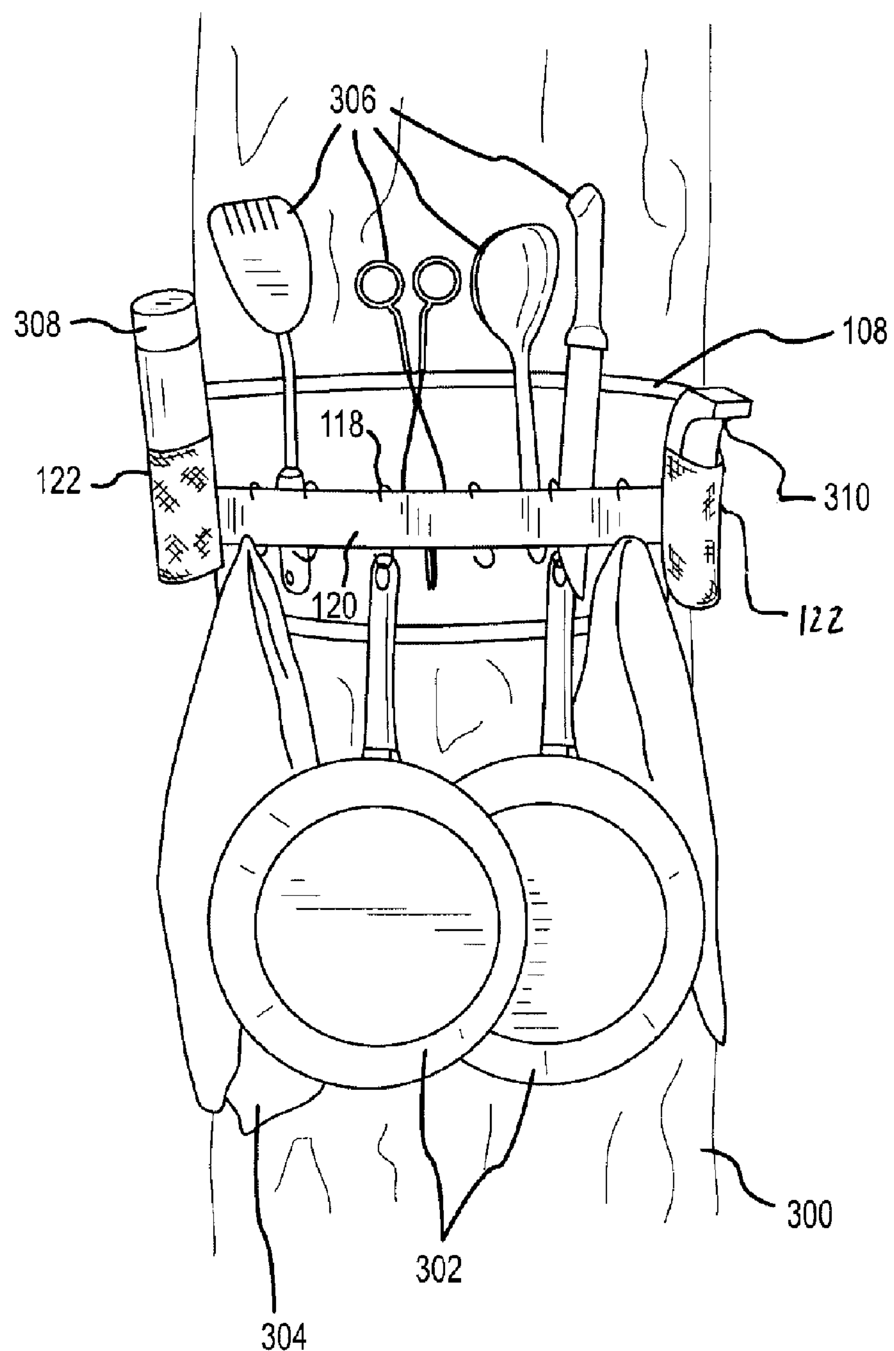
FIG. 3 illustrates the hanger of FIGS. 1 and 2 secured to a tree.

Referring to FIG. 3, hanger 100 is shown in operation. As can be seen, adjustable strap 110 is secured to a tree 300 as the vertical support. Foldable backing 108 is adjacent tree 300, which inhibits the ability of equipment being hanged from abutting the bark of tree 300, which helps protect from damage. In this example, which is by no means limiting, pans 302 and dish towels 304 are hanged on hooks 118, cooking utensils 306 are hanged in slots 120, and cooking spray 308 and a gas powered lighter 310 reside in bags 122. As can be seen by FIG. 3, another advantage of hanger 100 keeping equipment away from the surface of the vertical support, which in this case is tree 300, is that the equipment remains cleaner and more hygienic.

As can be appreciated, hanger 100 can be of multiple sizes and configurations. For example, the above hanger 100 comprises about 6 hooks 118, about 8 slots 120, and about 2 bags 122. More or less hooks 118, slots 120, and bags 122 are possible. The number of hooks 118, slots 120 and bags 122 may cause foldable backing 108 to be larger or smaller. However, the number hooks 118, slots 120, and bags 122 as well as the length and width of foldable backing 108 is largely a matter of design choice.

Figure 4:
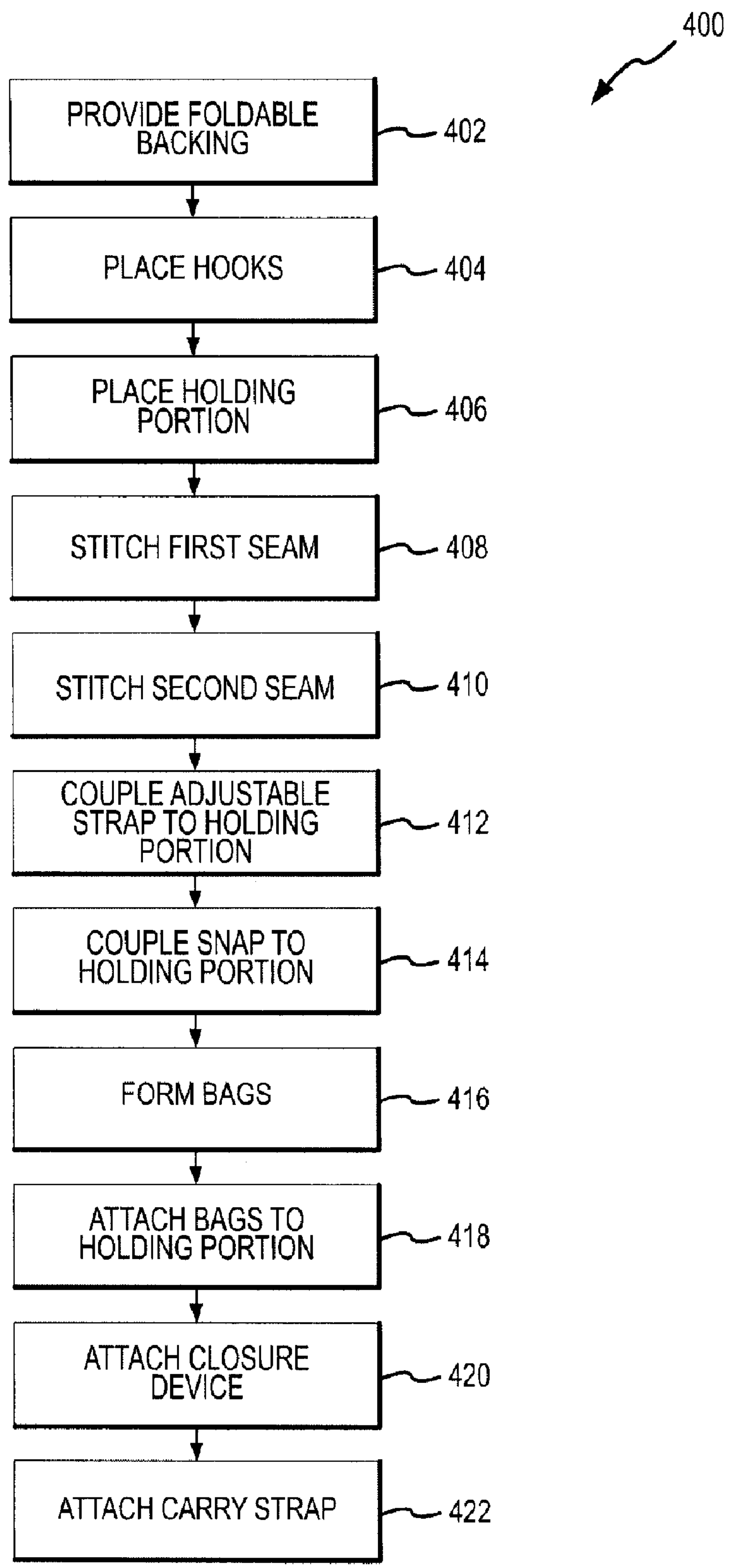
FIG. 4 is a flowchart illustrative of a method of constructing the hanger of FIGS. 1 and 2.
Figure 5:
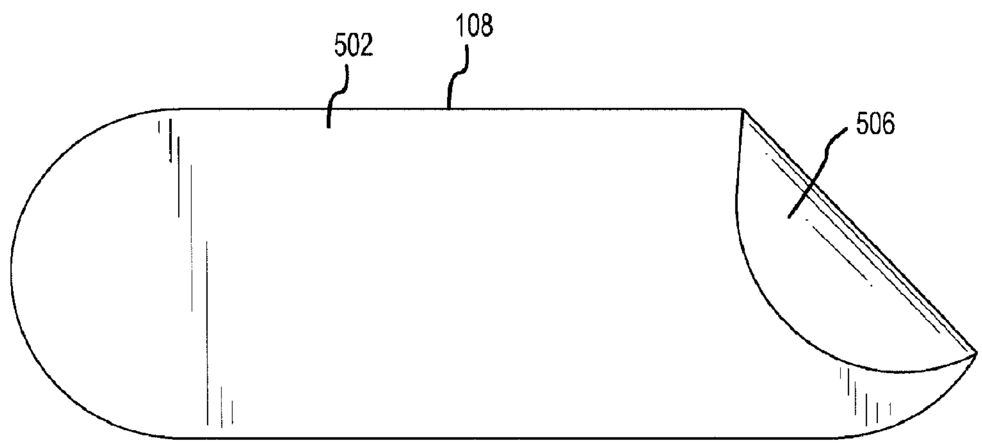
FIG. 5 shows a portion of foldable backing 108 of FIGS. 1 and 2.
Figure 6:
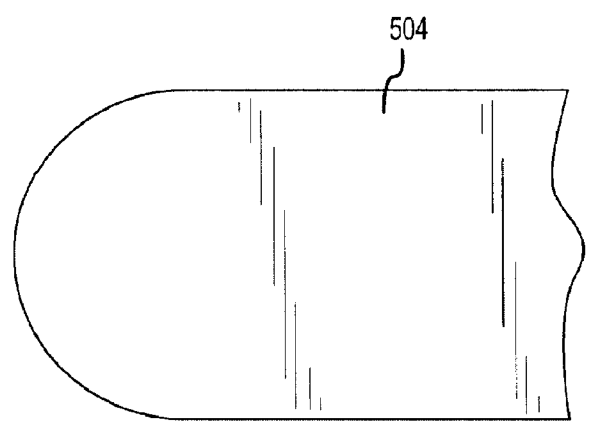
FIG. 6 shows another portion of foldable backing 108 of FIGS. 1 and 2.
Figure 7:
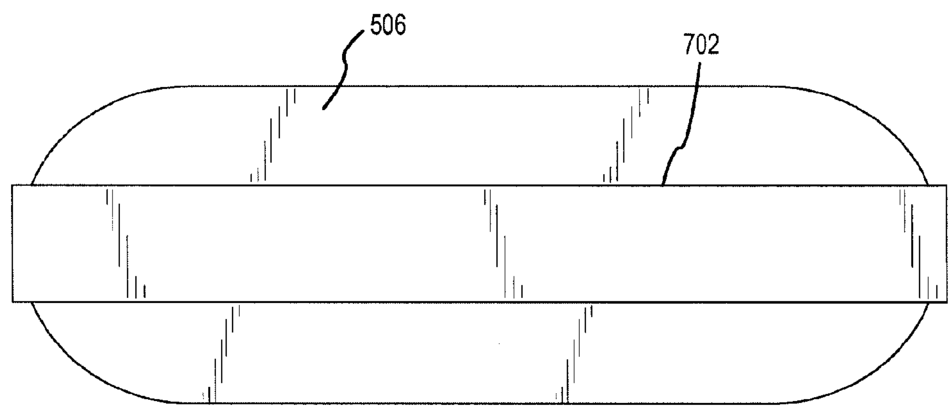
FIG. 7 shows another portion of foldable backing 108 of FIGS. 1 and 2.

Assembly of hanger 100 will now be described with reference to flowchart 400, FIG. 4, and FIGS. 5-11. Referring first to FIG. 4 and FIGS. 5 and 6, foldable backing 108 is provided, step 402. Foldable backing 108 may be a single piece of durable material, such as, for example, PVC, polyurethane, nylon, leather, synthetic leather, or the like. However, it has been found making foldable backing 108 out of multiple layers including an inside layer 502 (FIG. 5), which is adjacent the equipment, an outside layer 504 (FIG. 6), which is adjacent the vertical support, and a middle layer 506 (FIG. 5), which is between inside layer 502 and outside layer 504 provides increased strength and durability as well as some separation between hanged equipment and the vertical support as explained above. Layers 502, 504, and 506 are typically stitched together. Middle layer 506 typically has a hanging portion support 702 (FIG. 7) traversing the length of foldable backing 108. Holding portion support 702 is covered by outside layer 504.

Figure 8:
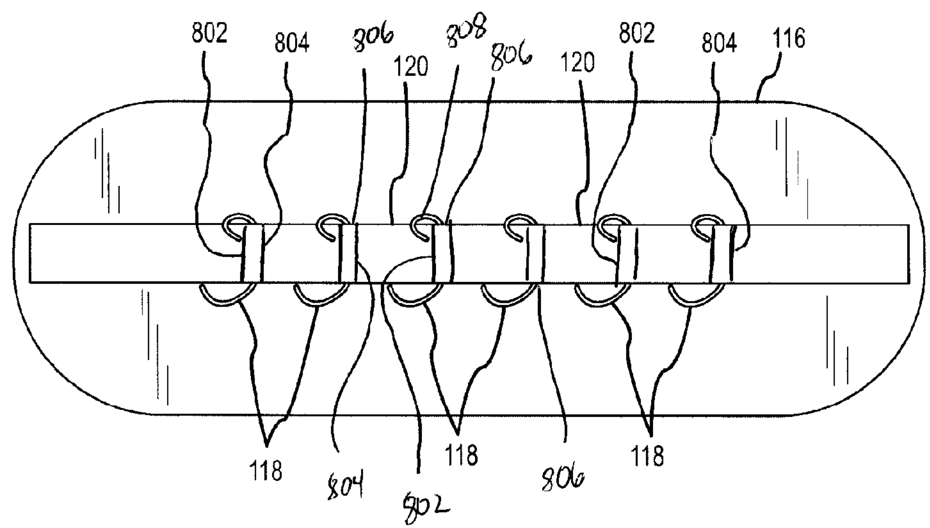
FIG. 8 shows another portion of foldable backing 108 of FIGS. 1 and 2 with hooks and slots formed.

Next, hooks 118 are placed on inside layer 502, step 404. Holding portion 116 is placed over hooks 118, step 406, and a left seam 802 is stitched into inside layer 502 and holding portion support 702, step 408. After the left seam is formed, a right seam 804 is stitched, step 410. Left seam and right seam can be made in reverse order, but the seams should be placed as close as possible to hooks 118 to increase strength and inhibit slippage. FIG. 8 shows seams 802 and 804 as stitching, but seams 802 and 804 could be any conventional coupling device, such as, for example, adhesives, fusion bonding, or the like. Seams 802 and 804 can be adjusted depending on the weight hooks 118 are expected to hold. Seams 802 and 804 form a channel 806 in which a portion of hooks 118 reside. Seam 802, seam 804, and channel 806 allows the hook to move from a flat storage position where the hook is flush with the foldable backing to a projecting use position where the hook is angled away from the foldable backing, up to an including a 90 degree angle. Also, hook 118 includes hooked portions 808 which further inhibits slippage of hook 118 and inhibits hook 118 from becoming disengaged.

Hooks 118 and holding portion 116 are generally aligned with holding portion support 702. As one of ordinary skill in the art can appreciate, to facilitate placing and attaching hooks 118, outside layer 504 is typically attached after hooks 118 are placed and attached. Slots 120 are formed by gaps in holding portion 116 between left seams 802 and right seams 804. The size of slots 120 can be adjusted by a distance d between hooks 118.

Figure 9:
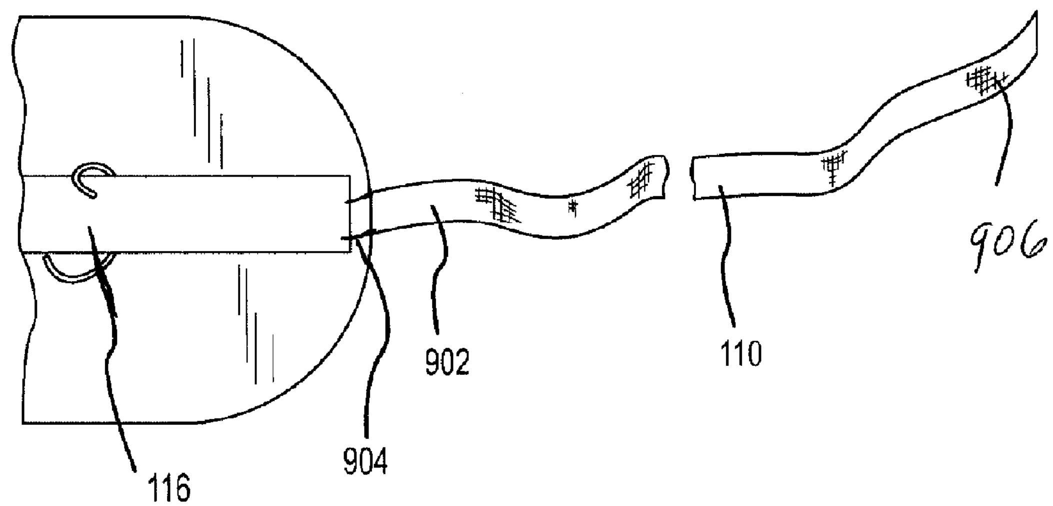
FIG. 9 shows another portion of foldable backing 108 of FIGS. 1 and 2 with a strap.
Figure 10:
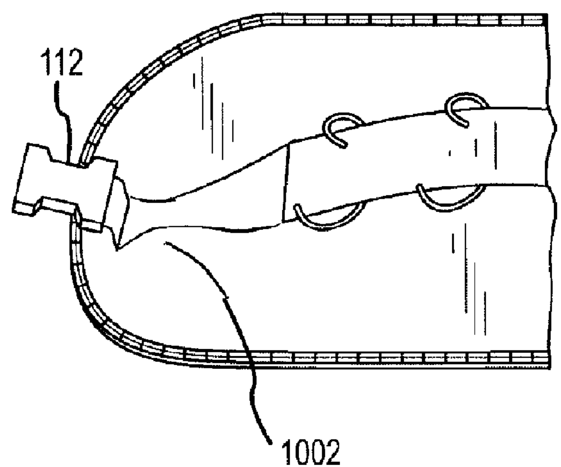
FIG. 10 shows another portion of foldable backing 108 of FIGS. 1 and 2 with a receptacle.
Figure 11:
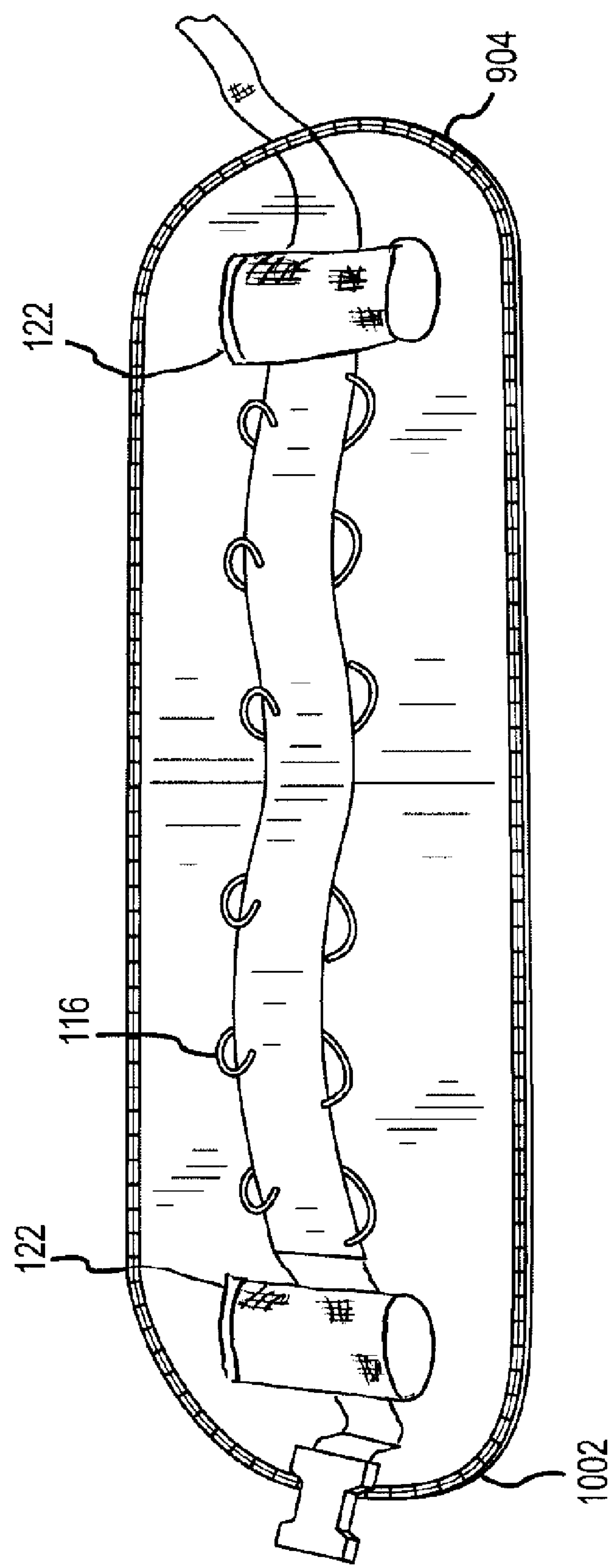
FIG. 11 shows foldable backing 108 of FIGS. 1 and 2 with hooks, slots, bags, strap, prongs, and a receptacle.

Next, referring to FIG. 9, adjustable strap 110 have a first end 902 is coupled to holding portion 116 at a first end 904 of holding portion 116, step 412. Adjustable strap 110 and holding portion 116 may be attached by a heavy duty stitch to support the weight expected to be hanged on hanger 100. One possible stitch is, for example, a heavy duty cross stitch. However, other stitches as are generally known in the art may be used. Elastic prong 114 with a buckle **114*b* (FIG. 2) are attached to a second end 906 (FIG. 9) of adjustable strap 110**.

Snap 112 is secured to a second end 1002 (FIG. 10) of holding portion 116, step 414. Snap 110 releasably couples with prong 114 to allow adjustable strap to be secured to vertical support, such as, for example, tree 300.

Bags 122 are formed, step 416, and attached to holding portion 116 using seams 1102 (FIG. 11), step 418. Bags 122 are shown at first end 904 and second end 1002, but could be located elsewhere. Bags 122 are shown comprising mesh fabric, but other fabric is acceptable. Bags 122 should be durable, such as, for example, a plastic or nylon mesh.

VELCRO 134 or zipper 136 would be attached to foldable backing 108, step 420. Finally, a carrying strap 106 is attached about a central axis CL (FIG. 2) of hanger 100, step 422.

Figure 12B:
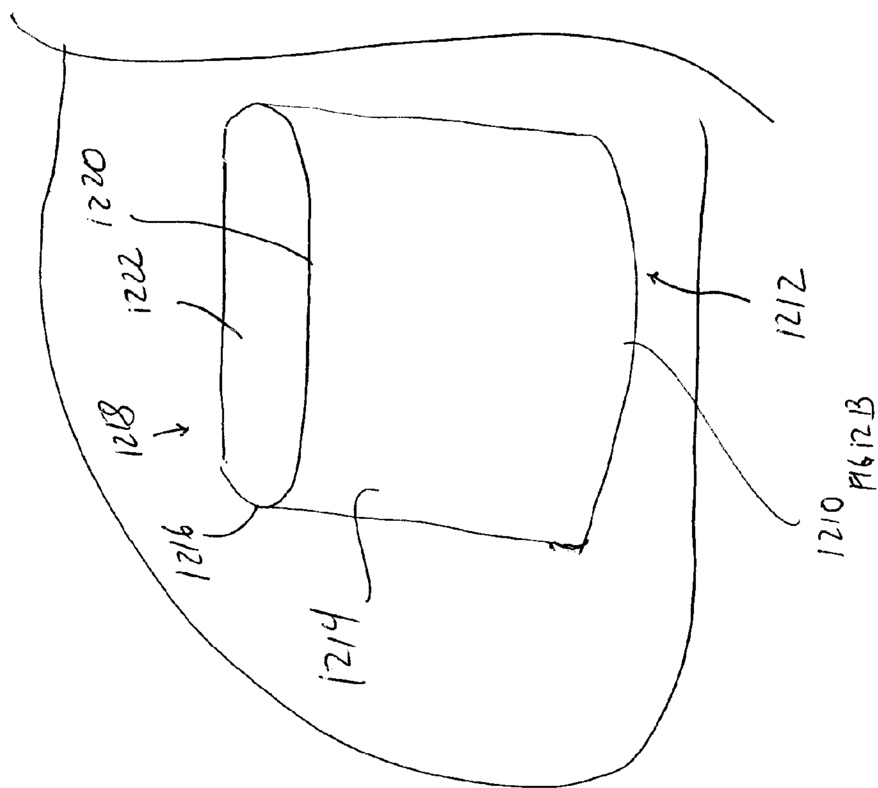
FIGS. 12A and 12B show an alternative bag or pouch consistent with an embodiment of the present invention.
Figure 12A:
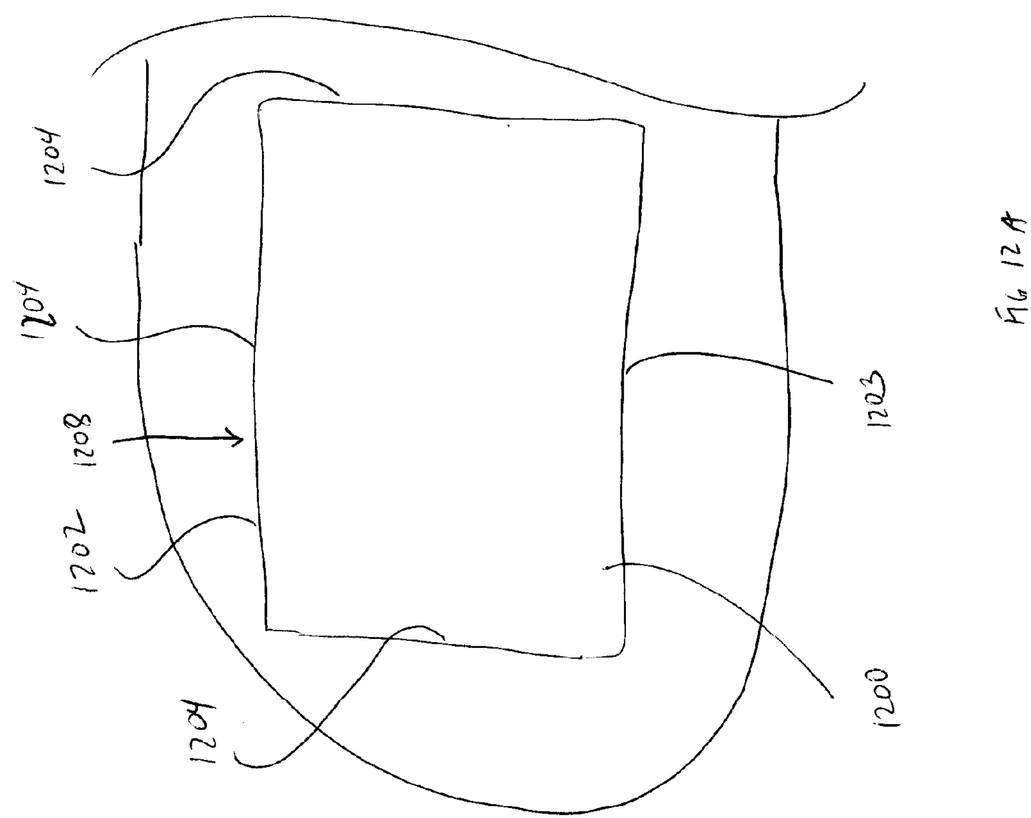
Figure 13:
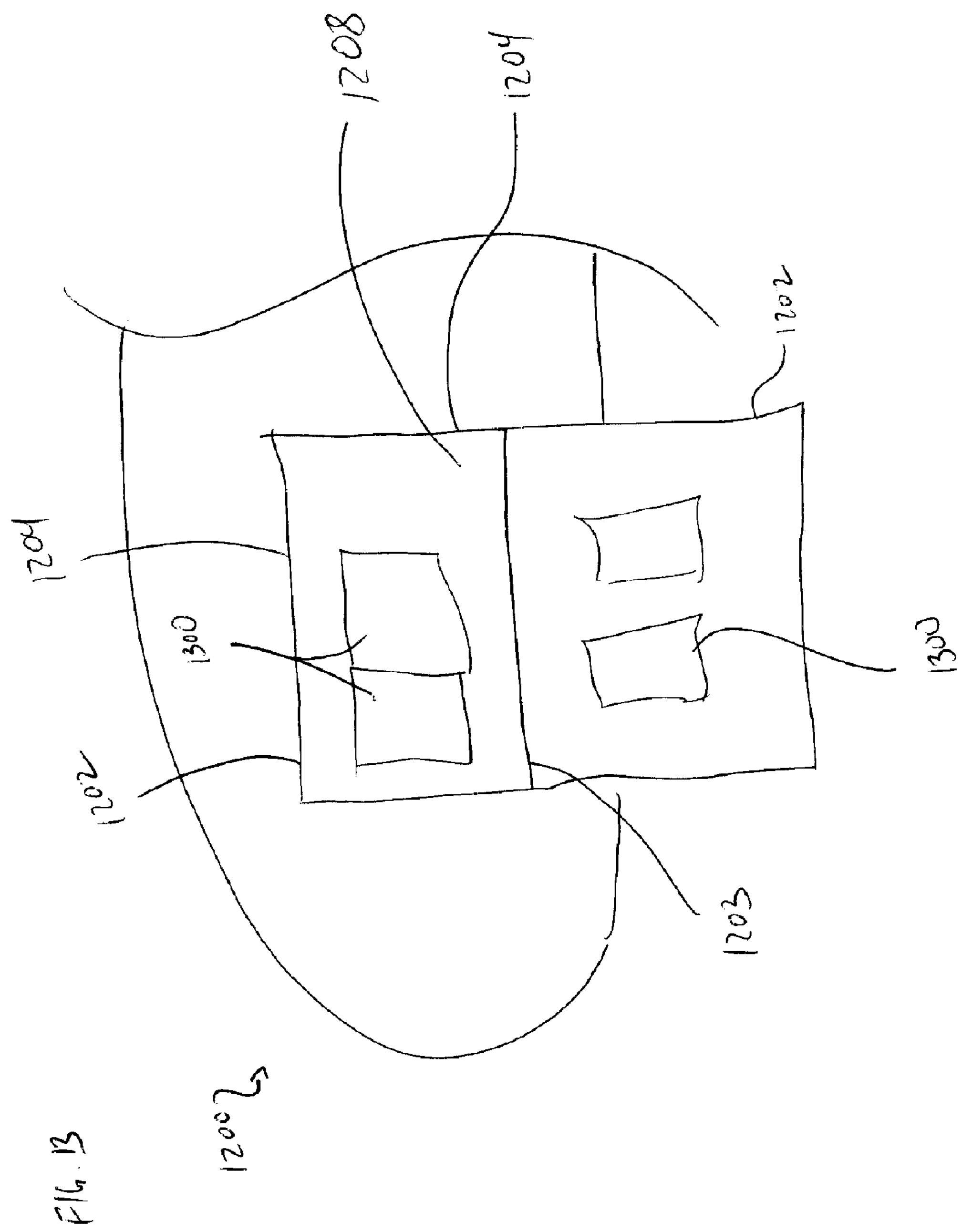
FIG. 13 shows the bag of FIG. 12 opened.

Referring now to FIG. 12A, another holding device 1200 is shown. Holding device 1200 is useful for medical supplies or other environmentally sensitive material, such as, a first aid kit, pills, or the like. Holding device 1200 is a pouch or closable bag type holding device. Holding device 1200 is coupled to holding portion 116 using a closure device, such as, a zipper 1202 as shown, but zipper 1202 could be replaced with hook and loop material, such as VELCRO 134 or the like. As shown holding device 1200 is coupled to holding portion 116 by a seam 1203, such as a stitched seam, a fusion seam, or a glued seam, to holding portion 116 on a bottom. Zipper 1202 extends about an outer edge 1204 of holding device 1200 such that holding device 1200 forms a pouch like space 1208 between backing 108 and holding device 1200. Alternatively, seam 1204 could extend more or less around outer edge 1204 with more or less of the closure being provided by zipper 1202. When unzipped, holding device 1200 may hang from hanger 100 as shown in FIG. 13. Holding device 1200 may have pouches pockets 1300 or the like internal to holding device 1200.

FIG. 12B shows an alternative holding device 1210. Holding device 1210 is similar to bags 122 in that holding device 1210 has a bottom 1212 and sidewall 1214. Sidewall 1214 has a lip 1216 defining an opening 1218. A zipper 1220 is attached to lip 1216 and a closure flap 1222 releasably secures to lip 1216 using zipper 1220.

An embodiment of the present invention and many of its improvements have been described. It should be understood that this description has been made by way of example, and that the invention is defined by the scope of the following claims.

What is claimed is:

1. A method of supporting one or more articles above a ground surface, the method comprising:

providing a portable hanger, comprising:

a foldable backing, the foldable backing having an inside layer, an outside layer, and outer edge, a first backing end, and a second backing end;

a first closure device, the closure device coupled to the outer edge such that the portable hanger can be folded into a closed position and closed by the closure device and unfolded into an open position;

a strap, the strap having a first strap end and a second strap end;

a snap, the snap having a first snap end and a second snap end;

a plurality of article supporting structures that include one or more hooks, slots, and at least one holding device, wherein;

the first strap end is coupled to the first backing end and the second strap end is releasably coupled to the snap second end;

the snap first end is coupled to the second backing end;

the plurality of article supporting structures coupled to the inside layer; and the holding device comprising a container space and a second closure device to allow access to the container space, wherein the plurality of article supporting structures being contained in the portable hanger in the closed position and exposed when the portable hanger is in the open position;

placing the portable hanger in the open position;

positioning the portable hanger against an exterior surface of an upright, inanimate object, in a vertically-spaced relationship with the ground surface, so that the inside layer of said foldable backing is faced away from the exterior surface of said inanimate object;

removably securing the portable hanger with the inanimate object by positioning the strap around the exterior surface of the inanimate object and coupling the first snap end and a second snap end with one another; and removably coupling the one or more articles with at least one of said plurality of article supporting structures.

2. The method of claim 1, further comprising:

uncoupling the first snap end and a second snap end from one another;

removing the portable hanger from the inanimate object;

positioning the strap adjacent the interior layer of the flexible backing;

placing the portable hanger in the closed position; and securing the portable hanger in the closed position with the first closure device;

wherein the first closure device is a zipper.

3. The method of claim 1, wherein the holding device further comprises a bottom, a sidewall, and a closure flap that defines the container space, and the second closure device allows the closure flap to be opened to allow access to the container space.

4. The method of claim 1, wherein the portable hanger is further comprised of at least one bag operatively coupled with the inner layer of the flexible backing.

5. The method of claim 1, wherein the upright, inanimate object is a tree.

* * * * *